UNITED STATES PATENT OFFICE.

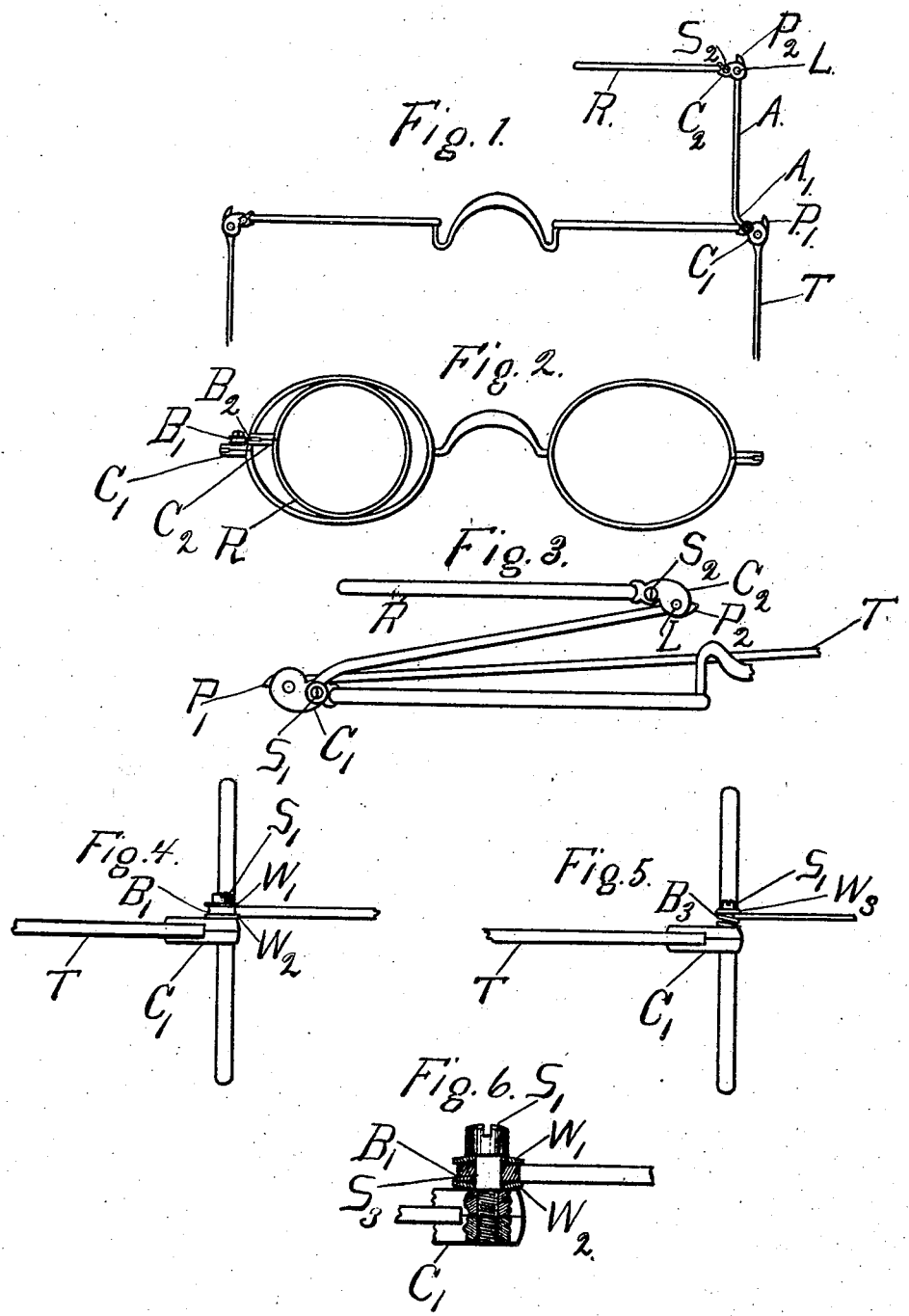
C. A. STEVENS.
LENS HOLDING ATTACHMENT FOR SPECTACLES.
APPLICATION FILED AUG. 17, 1914.
1,185,446.
Patented May 30, 1916.

CLARENCE A. STEVENS, OF NICKERSON, KANSAS.

LENS-HOLDING ATTACHMENT FOR SPECTACLES.

1,185,446.  Specification of Letters Patent.  Patented May 30, 1916.

Application filed August 17, 1914. Serial No. 857,202.

*To all whom it may concern:*

Be it known that I, CLARENCE A. STEVENS, a citizen of the United States, residing at Nickerson, in the county of Reno and State of Kansas, have invented a new and useful Improvement in Lens-Holding Attachments for Spectacles, of which the following is a specification.

This invention is an attachment for spectacles of the ordinary type, for the purpose of holding an auxiliary lens in such a manner that it can be readily combined in use with the usual distance lens or conveniently thrown out of the line of vision when desired without detachment from the spectacle frame.

It consists essentially of a support bearing at one end a lens holder and provided at its other end with means for permitting its attachment to the spectacle frame by a single screw of special form which screw replaces one of the screws of the frame.

The principal objects of the invention are to provide a device of the class indicated which is convenient in use and conveniently disposed of when not in use, and which can be folded closely enough to permit the spectacles to be placed in an ordinary case.

It is obvious that this holder may carry a jeweler's magnifier, a reading lens, a botanist's lens, or any lens that it may be desired to combine with the distance lens.

In the drawings illustrating my invention, Figure 1 is a top plan view of a pair of spectacles with my attachment applied thereto, the temples being partly broken away, Fig. 2 is a front view of the same, Fig. 3 is an enlarged top plan view of my device attached to a spectacle frame and partly folded for carrying, Fig. 4 is an enlarged detail view of the frictional joint, Fig. 5 a similar view of a modified form of said joint, and Fig. 6 a partly sectional view of the joint shown in Fig. 4, further enlarged.

In the drawings the spectacles shown are of the rimmed form but my device is as readily attached to those of the rimless type. Many parts illustrated being of ordinary construction and forming no part of my invention are not described.

As illustrated, the temple T, temple clamp $C_1$, and stop projection $P_1$ are of the usual form. The auxiliary lens holder comprises the lens ring R and the support clamp $C_2$ provided with the screw $S_2$, all formed as is usual in spectacle construction, except that ring R is circular in form. The arm A is provided at its inner end with a bearing portion $B_1$ perforated to receive the screw $S_1$ and at its other end with bearing portion $B_2$ perforated to receive the pivot L of clamp $C_2$ and with the stop projection $P_2$ as is common in the art. The specially formed screw $S_1$ is of sufficient length to pass through bearing portion $B_1$ and also to take the place of the usual clamp securing screw. In order that the temple and clamp members may be properly secured at this point the screw $S_1$ is enlarged in the portion outside the temple clamp to form a shoulder $S_3$ which is brought into engagement with the upper surface of the clamp when the screw is tightened. Sufficient friction is required between arm A and its pivotal connection with the frame to cause it to remain in any position to which it may be adjusted. This friction is obtained in the preferred form of the invention by use of the spring washers $W_1$ and $W_2$, engaging the bearing $B_1$ on its opposite sides as will be readily understood from Fig. 6. Instead of employing bearing $B_1$ and the washers $W_1$ and $W_2$ I may obtain the necessary friction by coiling the inner end of arm A to form a spring bearing $B_3$, using this in conjunction with the plain washer $W_3$ as shown in Fig. 5.

When the spectacles are not in use, arm A is rotatable through an angle of approximately two hundred seventy degrees on the screw $S_1$, its rotation being limited in the forward direction by contact between the curved portion $A_1$ and the adjacent portion of the frame as shown in Fig. 1, and limited in the opposite direction by contact with the rear surface of the spectacle lens. The auxiliary lens holder rotates about pivot L through approximately ninety degrees, the rotation being limited in one direction by stop $P_1$ and in the other by contact with the body of arm A. For carrying, the parts can be more closely folded than indicated in Fig. 3, being here shown in slightly open form for clearness in illustration. It is thus seen that the device permits the auxiliary lens to lie against the temple T and parallel with it whether the spectacles are in use or closely folded.

When the glasses are in use and the auxiliary lens is not needed, arm A is rotated outward and backward to lie just above and parallel with temple T and the auxiliary lens with its holder is folded inward against the temple. In this position the device is inconspicuous to the observer and unobjectionable to the wearer.

While I have shown and described my invention as attached to a pair of spectacles there is nothing in its structure to prevent its use in connection with any frame adapted to hold it in position for use.

I claim:

1. An attachment for spectacles comprising a supporting arm, a lens holder, and an attaching screw, said screw being in pivotal engagement with said arm at one end thereof, and said lens-holder being in pivotal engagement with the other end of said arm, said arm being provided with means for limiting its own rotation and with means for limiting the rotation of said lens-holder.

2. The combination with a frame, of a supporting arm, a lens-holder, and means pivotally securing said arm at one of its ends to said frame, the lens-holder being provided with means pivotally securing it to said arm at its other end, said arm being provided with means for limiting its own rotation and with means for limiting the rotation of said lens-holder.

3. The combination with a spectacle frame, of a supporting arm, a lens-holder pivotally secured to said arm at its outer end, and means at the inner end of said arm pivotally securing the arm to the frame, said arm being rotatable with respect to said frame through an angle of substantially two hundred and seventy degrees in one angular direction and said lens-holder being rotatable with respect to the arm through substantially ninety degrees in the opposite direction.

CLARENCE A. STEVENS.

Witnesses:
A. L. RISLEY,
R. G. ABBOTT.